United States Patent [19]
Takarada

[11] 3,848,108
[45] Nov. 12, 1974

[54] SERVO FEED CONTROL FOR ELECTRICAL DISCHARGE MACHINING

[75] Inventor: Eiichi Takarada, Rockford, Ill.

[73] Assignee: Amsted Industries Incorporated, Chicago, Ill.

[22] Filed: Nov. 1, 1973

[21] Appl. No.: 411,684

[52] U.S. Cl.............. 219/69 G, 307/251, 307/279
[51] Int. Cl............................................ B23k 9/16
[58] Field of Search......... 219/69 G, 69 C; 318/280, 318/281, 560; 307/251, 279

[56] References Cited
UNITED STATES PATENTS

| | | | |
|---|---|---|---|
| 3,167,631 | 1/1965 | Schulz et al. | 219/69 G |
| 3,558,844 | 1/1971 | Lobur | 219/69 G |
| 3,727,024 | 4/1973 | Bell | 219/69 G |

Primary Examiner—C. L. Albritton
Assistant Examiner—Hugh D. Jaeger

[57] ABSTRACT

A servo system for electrical discharge machining processes adapted to regulate a spark-discharge gap in electro-discharge machining. The system includes a gap voltage sensing means, a reference voltage source, and an electrically operated motive means connected therebetween. The gap voltage sensing means senses a scaled down voltage which is proportional to the peak gap voltage resulting from each machining pulse. Sensing of the peak voltage on a per pulse basis provides more responsive control of the servo feed mechanism, thereby maintaining optimum gap spacing between an electrical discharge machining electrode and workpiece.

4 Claims, 1 Drawing Figure

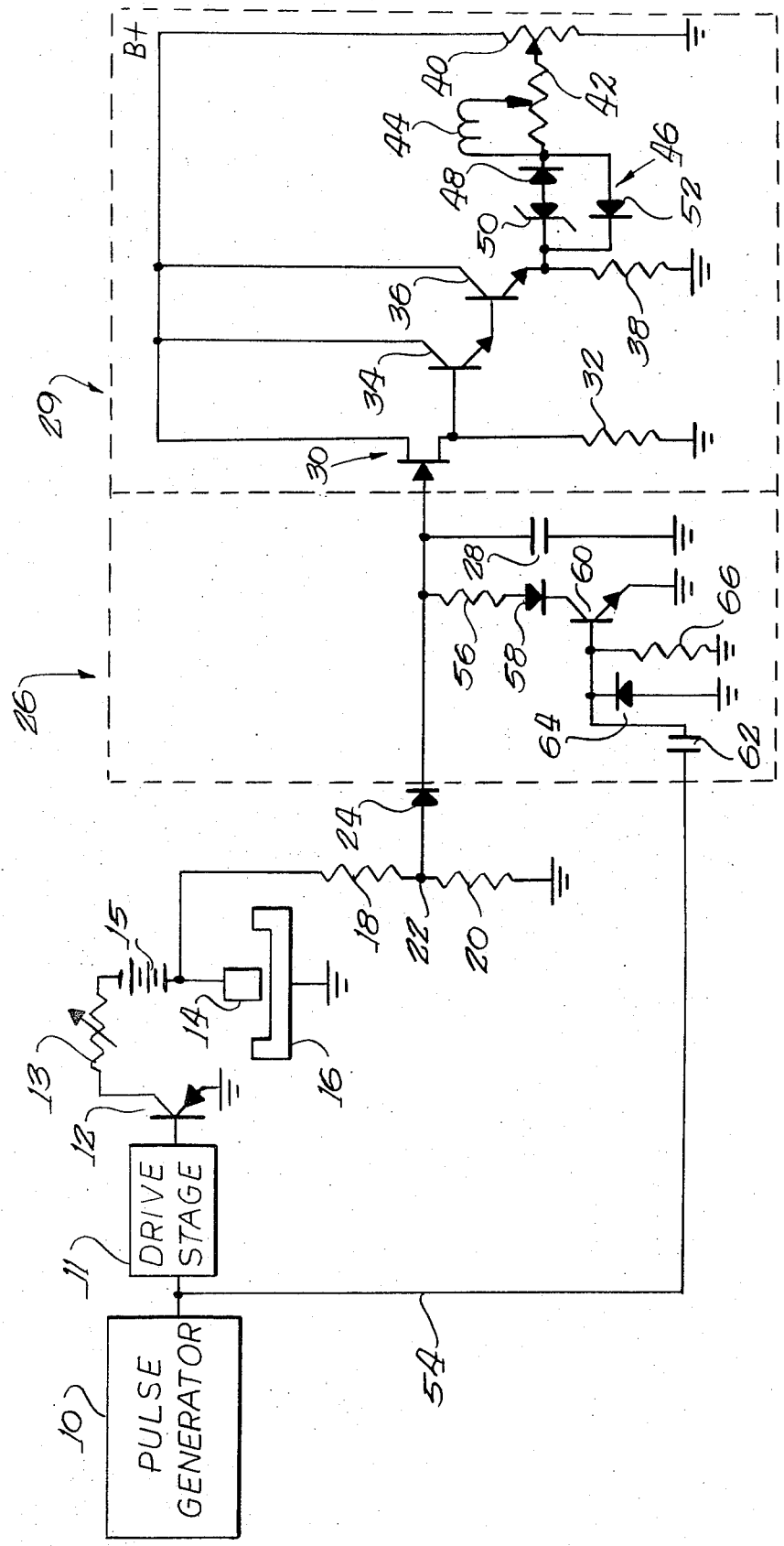

3,848,108

SERVO FEED CONTROL FOR ELECTRICAL DISCHARGE MACHINING

BACKGROUND OF THE INVENTION

This invention pertains to improved apparatus for electrical discharge machining, sometimes called spark-machining or arc-machining, or EDM. Modern practice in the EDM art usually requires that the electrode which determines the shape and form of an opening or cavity being cut be positioned with respect to the workpiece and fed toward the workpiece during machining by means of an automatic servo feed mechanism which responds to variations in voltage or current conditions in the gap. The improved servo feeds currently in use are either hydraulic or mechanical and respond to sensing and control circuitry which monitor the position of the electrode with respect to the workpiece. This is accomplished by sensing various electrical characteristics of the gap where those characteristics are representative of gap spacing, and causing advance or retraction of the electrode as required to maintain an optimum gap spacing.

SUMMARY OF THE INVENTION

The present invention provides an energy storage network for storing a voltage representative of the peak voltage imposed across the gap. The servo feed control circuit responds to the stored voltage by either advancing or retracting the electrode from the workpiece depending on the value of the stored voltage pulse. The storage network discharges the stored voltage just prior to the imposition across the gap of the next machining pulse, thereby enabling the storage of a voltage corresponding to the peak value of the next pulse when it appears across the gap. Thus it can be seen that by sensing each pulse as it appears across the gap, the invention provides for an improved servo feed control for EDM which possesses increased sensitivity and improved stability.

BRIEF DESCRIPTION OF THE DRAWINGS

FIG. 1 is a combined schematic and diagrammatic showing of the invention.

DESCRIPTION OF THE PREFERRED EMBODIMENT

In the interest of brevity, the power supply circuit has been simplified in the manner shown. An appropriate pulse generator 10, shown in block form, may include for example a multi-vibrator stage not shown, but which is well known in the art, and may be used to provide variable on-off time pulses. The output of pulse generator 10 is fed to a drive stage 11 the output of which furnishes triggering pulses to trigger the output transistor 12. The frequency of these pulses and their relative on-off time being regulated according to the pulse generator 10 whereby output transistor 12 is periodically rendered conductive. The actual cutting current is provided by a main machining power source 15 at a nominal open gap voltage on the order of 100 volts. A rheostat 13 is connected in series between output transistor 12 and the main machining power source 15 for regulating machining current magnitude. The positive terminal of the main machining power source 15 is connected to a tool electrode 14 which is spaced above a workpiece 16 resulting in the formation of a gap therebetween. The above described arrangement is utilized to furnish pulses to the gap and provide discrete electrical discharges thereacross to remove particles from workpiece 16. A constant flow of dielectric coolant (not shown) is maintained through the gap to wash eroded particles as the machining process continues.

A resistive voltage divider 18 and 20 is connected across the gap. The midpoint 22 of voltage divider 18 and 20 is connected to the anode of a rectifier or diode 24, thereby allowing the gap voltage signal to pass through rectifier or diode 24 to the energy storage network shown generally at 26.

The gap voltage signal which is proportional to the peak voltage at the gap is stored in a capacitor 28 connected between the cathode of rectifier 24 and ground. The positive terminal of capacitor 28 is also connected to the input of the control circuitry shown generally at 29, which is the gate of a field effect transistor 30. Thus the stored voltage is imposed on the gate of field effect transistor 30. During the gap off-time, field effect transistor 30 does not discharge storage capacitor 28 because of the extremely high input impedance of field effect transistor 30. Storage capacitor 28 is also prevented from discharging through resistor 20 by rectifier 24.

Field effect transistor 30 is connected in what is commonly known as a source follower arrangement. The source of field effect transistor 30 is connected to ground through a resistor 32, which is a current limiting resistor that holds current to a level within the capability of field effect transistor 30. Transistors 34 and 36 are connected in a Darlington pair arrangement with the base of transistor 34 being connected to the source of field effect transistor 30 and acting as the input to the Darlington amplifier. The emitter of transistor 36 is returned to ground through a resistor 38. The drain of field effect transistor 30 and the collectors of each transistor 34 and 36 are connected to a positive voltage bus B+.

Servo control circuit 29 has a reference voltage derived from the variable resistance of a reference potentiometer 40, one end of which is connected to the positive voltage bus B+ and the other end connected to ground. The arm or pointer of reference potentiometer 40 is connected to one end of a servo gain potentiometer 42. The arm or pointer of servo gain potentiometer 42 is connected to one terminal of a servo valve coil 44. The other end of servo gain potentiometer 42 is connected to the other terminal of servo valve coil 44 and a network of diodes 46. Varying the position of the arm or pointer on servo gain potentiometer 42 gives a selectively variable gain control providing an adjustment for the feedback gain of the servo operation.

Diode network 46 mentioned above consists of a first diode 48 in series with a zener diode 50, the anodes of which are connected together. In parallel with the aforementioned series combination is a third diode 52, the anode of which is connected to the cathode of first diode 48 and one end of servo velocity potentiometer 42. The cathode of third diode 52 is connected to the cathode of zener diode 50 and the emitter of transistor 36.

The primary function of diode network 46 is to eliminate a condition commonly known as hunting. Hunting is primarily due to the inherent backlash in the system. Basically, what occurs is that while the electrode is being advanced toward the workpiece, at some predetermined rate, it will at some point establish a gap of approximately 0.003 inches which will allow machining to commence. From this point on, the electrode must be advanced at a much slower rate in an effort to maintain a constant gap while the machining operation continues. When the optimum gap spacing is established, the servo control circuitry will establish a null condition thereby terminating the further advance of the electrode. However, due to the inherent backlash of the mechanized system, the electrode will overrun and the servo control circuitry will instantly compensate by signaling a backup. Upon backup the backlash will cause overrun in the opposite direction and a continuous hunting action is set up; such an action is certainly not conducive to the stable operation of the device.

Diode network 46, by providing a larger null range for the servo control circuit, eliminates the problem of hunting. The null range is established from zero to whatever zener voltage is selected for the zener diode.

Advancement or retraction of tool electrode 14 is regulated by the servo control valve (not shown) and is accomplished in a conventional manner. Initially gap reference potentiometer 40 is set to some predetermined voltage which corresponds to the voltage required to establish a null condition or zero current flow in servo valve coil 44 when the desired gap spacing is obtained.

If, for example, the voltage stored in capacitor 28 is greater than the voltage at gap reference potentiometer 40, the current will flow from left to right (in FIG. 1) through servo valve coil 44, thereby causing tool electrode 14 to advance. In the event the voltage at gap reference potentiometer 40 is higher than the voltage stored in capacitor 28, the current will flow from right to left (in FIG. 1) through servo valve coil 44, thereby causing the electrode to retract. Transistors 34 and 36 provide the necessary current gain to drive servo valve coil 44 in the event the voltage stored in capacitor 28 is greater than the voltage at gap reference potentiometer 40. It should be understood that the base of transistor 34 is at the same potential as the voltage stored in capacitor 28.

As previously mentioned capacitor 28 stores a voltage which is proportional to the peak voltage appearing across the gap. In order that capacitor 28 can be available to store a voltage which corresponds to the peak voltage for the next occurring pulse it is necessary that the capacitor be discharged prior to the arrival of the next occurring pulse at the gap.

The discharge of capacitor 28 is accomplished by furnishing a portion of the signal from pulse generator 10 via a transmission line 54 to energy storage network 26. The pulse from pulse generator 10 arrives at energy storage network 26 slightly in advance of the same pulse arriving at the gap. The delay between the pulse arriving at energy storage network 26 and the pulse arriving at the gap is on the order of 0.5u seconds, and results from the turn-on delay of the drive stage 11 and output transistor 12.

The positive-going pulse imposed at the base of discharge transistor 60 places discharge transistor 60 in a conductive state and thereby provides a discharge path for the discharge of capacitor 28 through a resistor 56, a diode 58 and the collector emitter junction of discharge transistor 60 as shown in FIG. 1. Resistor 56 is a current limiting resistor which limits the flow of current from capacitor 28 to within the safe limits of discharge transistor 60. Diode 58 prevents the positive-going pulse applied at the base of discharge transistor 60 from applying a charge to capacitor 28.

A coupling capacitor 62 is a small value capacitor which couples the base of discharge transistor 60 to transmission line 54, which in turn is connected to the output of pulse generator 10. Also connected to the base of discharge transistor 60 is the cathode of diode 64, the anode of which is grounded. In parallel with diode 64 is a resistor 66, one end of which is connected to the base of discharge transistor 60 and the other end returned to ground. The primary purpose of resistor 66 is to provide a ground return for the base electrode of discharge transistor 60.

Thus it may be seen that capacitor 28 stores a voltage that is proportional to the last preceding pulse that appeared across the gap, and that capacitor 28 is discharged by discharge transistor 60 just prior to the arrival of the next pulse at the gap. It is in this manner that the circuit responds to each individual pulse. As a result, the circuit is far more responsive to changing gap conditions which would have gone undetected in prior arrangements where average voltage at the gap was the parameter responded to by the servo control circuitry.

The terms and expressions which have been employed are used as terms of description and not of limitation, and there is no intention, in the use of such terms and expressions, of excluding any equivalents of the features shown and described or portions thereof, but recognize that various modifications are possible within the scope of the invention claimed. As would be clear to those skilled in the art, this arrangement can be adapted for use with multiple electrodes.

I claim:

1. In an electrical discharge machining apparatus having pulsing means for delivering intermittent erosive electrical discharges across a dielectric coolant-filled gap between a tool electrode and a workpiece, and further having feed control means for providing relative movement between said electrode and said workpiece; the improvement comprising a servo feed control circuit having an energy storage network connected across said gap, said energy storage network including means for storing a voltage that is proportional to the peak voltage imposed across said gap, and control circuitry for causing said feed control means to operate in response to said stored voltage, said energy storage network further including means for discharging said storage means in response to the output of said pulsing means, thereby discharging said storage means prior to the imposition of the next machining pulse across said gap.

2. In an electrical discharge machining apparatus as set forth in claim 1, said means for storing a voltage being a storage capacitor.

3. In an electrical discharge machining apparatus as set forth in claim 2, said discharge means being a transistor operatively connected across said storage capacitor.

4. In an electrical discharge machining apparatus having a pulse generator for delivering intermittent erosive electrical discharges across a dielectric coolant-filled gap between a tool electrode and a workpiece, and further having feed control means associated with said electrode for providing relative movement between said electrode and said workpiece in response to a voltage signal; the improvement comprising a storage network having means for storing a voltage signal which is proportional to the peak voltage imposed across said gap during the on-time cycle, said feed control means being responsive to said stored voltage, and wherein said storage network further includes means responsive to the output of said pulse generator for discharging said voltage storage means just prior to the arrival at the gap of the next on-time cycle.

* * * * *